(12) United States Patent
Havinga

(10) Patent No.: US 8,302,677 B2
(45) Date of Patent: Nov. 6, 2012

(54) COILED TUBING INJECTOR WITH A WEIGHT ON BIT CIRCUIT

(75) Inventor: Richard Havinga, Okotoks (CA)

(73) Assignee: Xtreme Drilling and Coil Services Corp., Alberta (CA)

( * ) Notice: Subject to any disclaimer, the term of this patent is extended or adjusted under 35 U.S.C. 154(b) by 401 days.

(21) Appl. No.: 12/441,746

(22) PCT Filed: Sep. 24, 2007

(86) PCT No.: PCT/US2007/020585
§ 371 (c)(1),
(2), (4) Date: Mar. 18, 2009

(87) PCT Pub. No.: WO2008/039411
PCT Pub. Date: Apr. 3, 2008

(65) Prior Publication Data
US 2009/0235656 A1    Sep. 24, 2009

Related U.S. Application Data

(60) Provisional application No. 60/846,721, filed on Sep. 22, 2006.

(51) Int. Cl.
*E21B 19/22* (2006.01)
*E21B 44/02* (2006.01)

(52) U.S. Cl. ........... 166/77.2; 166/77.1; 175/24; 175/27

(58) Field of Classification Search ........ 166/77.1–77.3; 175/61, 24, 27
See application file for complete search history.

(56) References Cited

U.S. PATENT DOCUMENTS

| | | | |
|---|---|---|---|
| 4,585,061 A | | 4/1986 | Lyons, Jr. et al. |
| 5,291,956 A | | 3/1994 | Muller et al. |
| 5,839,514 A | | 11/1998 | Gipson |
| 5,842,530 A | | 12/1998 | Smith et al. |
| 6,047,784 A | * | 4/2000 | Dorel .............................. 175/61 |
| 6,145,598 A | * | 11/2000 | Carisella ....................... 166/387 |
| 6,276,454 B1 | * | 8/2001 | Fontana et al. ............... 166/343 |
| 6,536,539 B2 | | 3/2003 | Merecka et al. |
| 6,923,273 B2 | | 8/2005 | Terry et al. |
| 7,150,324 B2 | * | 12/2006 | Laursen et al. ................ 166/355 |
| 2003/0201099 A1 | * | 10/2003 | Steffenhagen et al. ...... 166/77.3 |
| 2004/0020658 A1 | * | 2/2004 | Kulhanek et al. ............. 166/377 |

* cited by examiner

*Primary Examiner* — Giovanna Wright
(74) *Attorney, Agent, or Firm* — Bushman & Associates, P.C.

(57) ABSTRACT

A control circuit for a coiled tubing injector includes a circuit controller (14). One or more counterbalance valves (3) may be responsive to the circuit controller to prevent the tubing string from descending into the wellbore during rate of penetration movement. In one embodiment, a control valve (4) allows fluid to flow through a bypass line around the counterbalance valves when drilling in a weight-on-bit mode. Other hydraulic control circuits allow for the release of fluid pressure to control the injector hydraulic motor. In yet another embodiment, the control circuit regulates power to an electric motor of the injector.

13 Claims, 4 Drawing Sheets

COILED TUBING INJECTOR WITH A WEIGHT ON BIT CIRCUIT

CROSS REFERENCE TO RELATED APPLICATION

This application claims the priority of U.S. Provisional Application No. 60/846,721 filed on Sep. 22, 2006, the disclosure of which is incorporated herein by reference for all purposes.

FIELD OF THE INVENTION

The present invention relates to coiled tubing of injectors of a type commonly used in oilfield operation to raise or lower coiled tubing into a well. More particularly, the invention relates to a hydraulic circuit for controlling the drive motors of a coiled tubing injector so as to more reliably control weight on bit at various depths.

BACKGROUND OF THE INVENTION

Coiled tubing injectors have been used for years to inject coiled tubing into a well, while a drawworks and/or a top drive are conventionally used for raising and lowering threaded tubulars into a well. In either case, weight on bit circuits have been devised to control deploying the coiled tubing string or the threaded tubular string into the wellbore such that the rate of penetration is determined by the weight-on-bit (WOB) rather than a fixed rate of penetration.

A conventional top drive feed system typically uses hydraulic cylinders coupled to the top drive (TD) with a cable, chains, rack and pinion gears, or directly. The cylinders use hydraulic pressure to hold the top drive from traveling downwards, thereby preventing the drill string from descending into the borehole. In this conventional system, the operator may allow the top drive to descend by bleeding off hydraulic pressure to the feed cylinders. This is accomplished by using an operator adjustable relief valve. For example, if the feed system requires 2000 psi to support the drill string, the operator may set the relief valve to 1500 psi. Hydraulic fluid will then bleed off from the cylinder to the hydraulic tank and the drill string descends into the well bore. This pressure differential may result in an exemplary weight on bit of about 20,000 lbs.

The hydraulic system will always maintain this pressure differential. If the drill bit encounters a more difficult formation, the rate of penetration will slow. Conversely if the bit encounters a softer formation, the bit will descend more rapidly. At all times, the pressure differential will be 500 psi and the WOB will still be about 20,000 lbs.

The top drive (TD) travel may be governed by electrical motor, hydraulic motor, or mechanical means using a drawworks winch. In these cases, the system is frequently called an "auto drill," and consists of a mechanical drawworks lowering the drill string into the well bore. A brake on the drawworks controls decent and modulating the brake automatically accomplishes the same goal. More complex systems use electric or hydraulic drive motors on the drawworks controlled with PLC's (programmable logic controls).

Once a sufficient amount of drill pipe and a bottom hole assembly (BHA) is in the hole at the lower end of the drill pipe, the top drive feed system ceases to push the dill string into the hole. Instead, the desired to "weight on bit" may be obtained by restricting but not preventing the drill string from descending into the hole, so that the desired rate achieves the desired weight on bit.

Various techniques have been devised for controlling a drilling system, and particularly a coiled tubing drilling system which utilizes an injector. U.S. Pat. No. 4,585,061 discloses a system for inserting and withdrawing coiled tubing with respect to a well. Another technique for injecting coiled tubing into a well is disclosed in U.S. Pat. No. 5,839,514. U.S. Pat. No. 6,047,784 discloses the use of a sensor in a coiled tubing system to control weight-on-bit. U.S. Pat. No. 5,291,956 also discloses controlling a coiled tubing injector assembly. U.S. Pat. No. 5,842,530 discloses a telescopic injector frame, and U.S. Pat. No. 6,923,273 discloses different techniques for selectively obtaining a desired weight-on-bit for a tubing system. U.S. Pat. No. 6,536,539 discloses the use of coiled tubing in a horizontal drilling system.

The disadvantages of the prior art are overcome by the present invention, and an improved circuit controller for controlling a coiled tubing injector is hereinafter disclosed.

SUMMARY OF THE INVENTION

In one embodiment, a control circuit for a coiled tubing injector controls the raising or lowering of coiled tubing into a well. The injector includes an injector motor to power an injector drive mechanism, which engages the coiled tubing to raise or lower the coiled tubing. The circuit includes a circuit controller, and a counterbalance valve opening in response to the circuit controller to power the injector motor and closing in response to the circuit controller to prevent the tubing string from descending into the wellbore. A bypass line is provided around the counterbalance valve, and a control valve may be opened to bypass the counterbalance valve. The circuit controller varies power to the motor when the control valve is opened to raise or lower the coiled tubing.

In various embodiments, the control circuit varies power to the coiled tubing injector motor to maintain a substantially constant weight-on-bit. More particularly, the control circuit controls the injector motor to exert a controlled upward force on the coiled tubing through the injector drive mechanism, although this upward force is less than the drill string weight, thereby resulting in a substantially constant weight-on-bit. Other embodiments of a hydraulic control circuit are provided and an exemplary electrical control circuit is disclosed.

It is a feature of the present invention that the control circuit for controlling the coiled tubing injector may be operable in the "in-hole" mode which results in rate of penetration drilling, and also in the weight-on-bit mode, wherein the control circuit exerts a controlled opened force on the coiled tubing less than the coiled tubing string weight, thereby resulting in a substantially constant weight-on-bit.

These and further features and advantages of the present invention will become apparent from the following detailed description, wherein reference is made to the figures in the accompanying drawings.

DETAILED DESCRIPTION OF PREFERRED EMBODIMENTS

In one embodiment, an injector feeds coiled tubing into the well bore using a hydraulic motor to power the chains that carry the gripper blocks. At equilibrium, the hydraulic motor is holding the drilling string with a given pressure, e.g., approximately 2000 psi. That pressure may be supplied by a variable displacement, variable pressure hydraulic pump. The pump will thus be supplying 2000 psi pressure to the hydraulic motor, but there would be no flow of hydraulic fluid. The motor is stationary and holding the load by the supplied pressure.

The hydraulic circuit incorporates a counterbalance valve. The function of this valve is to prevent the load (the drill string) from descending into the well bore unless the injector circuit controller is in the "in-hole" mode. Selecting the in-hole mode opens the counterbalance valve, allowing the hydraulic motor to power the drill string into the borehole. The counterbalance valve also serves the function of a safety device. Should all hydraulic pressure be lost, the counterbalance valve closes, preventing the drill string from descending into the well bore. The in-hole mode results in "rate of penetration drilling", where the drill string is being pushed into the well bore.

When the operator selects the "weight-on-bit" mode, the counterbalance valve is bypassed. This is accomplished with an electrically operated solenoid valve that opens and provides an unrestricted path for the hydraulic fluid around the counterbalance valve. The drill string is now solely supported by the hydraulic pressure supplied by the pump to the motor, again at 2000 psi. The operator may then adjust the pressure of the pump to a lower value, e.g., 1500 psi, and the hydraulic motor will no longer be able to support the load and will run backwards, allowing the drill string to descend into the well bore. Again this pressure differential results in a given WOB.

Figure 1:
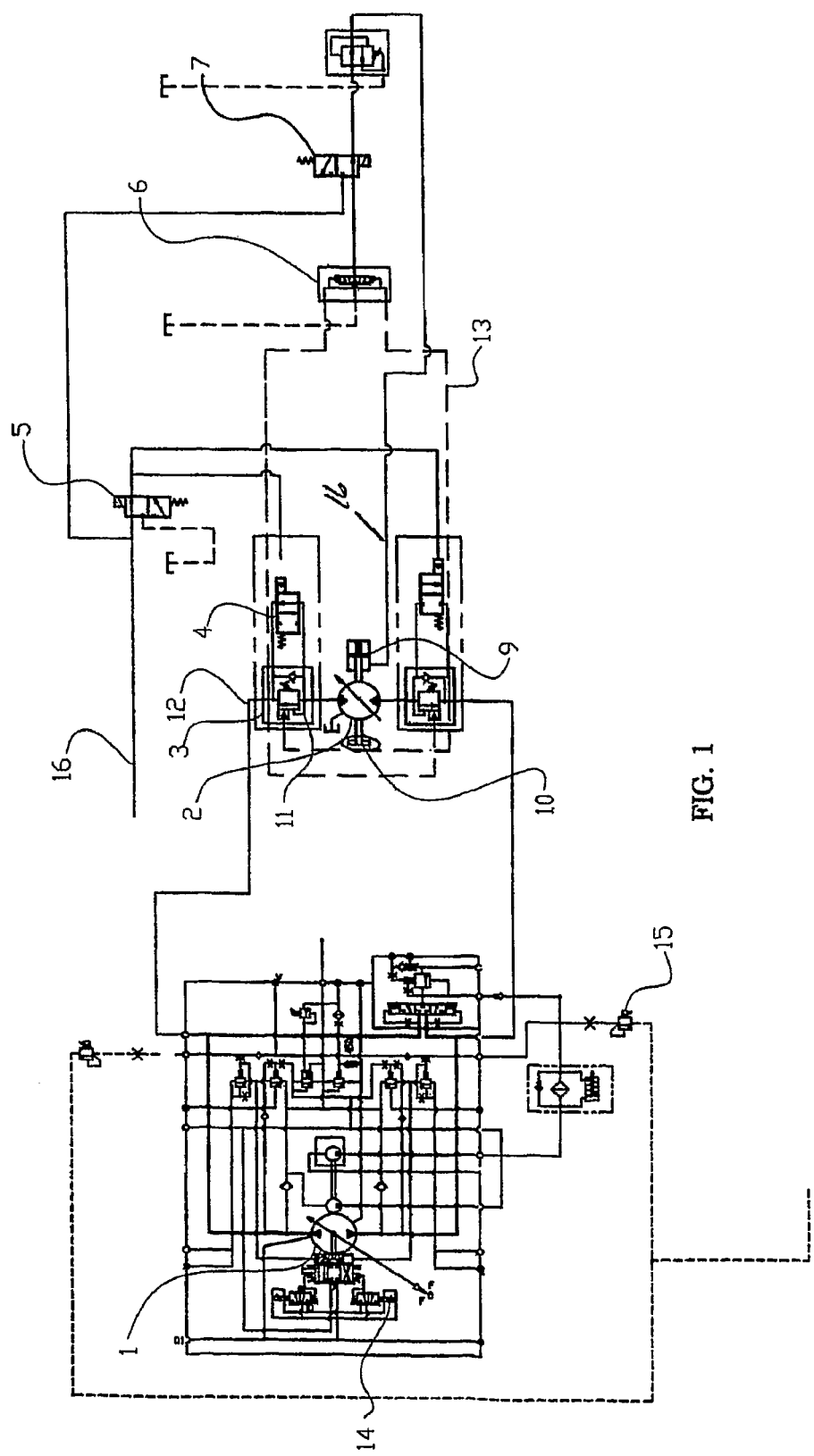
FIG. 1 is a suitable hydraulic circuit for controlling a coiled tubing injector according to one embodiment of the invention.
Figure 2:
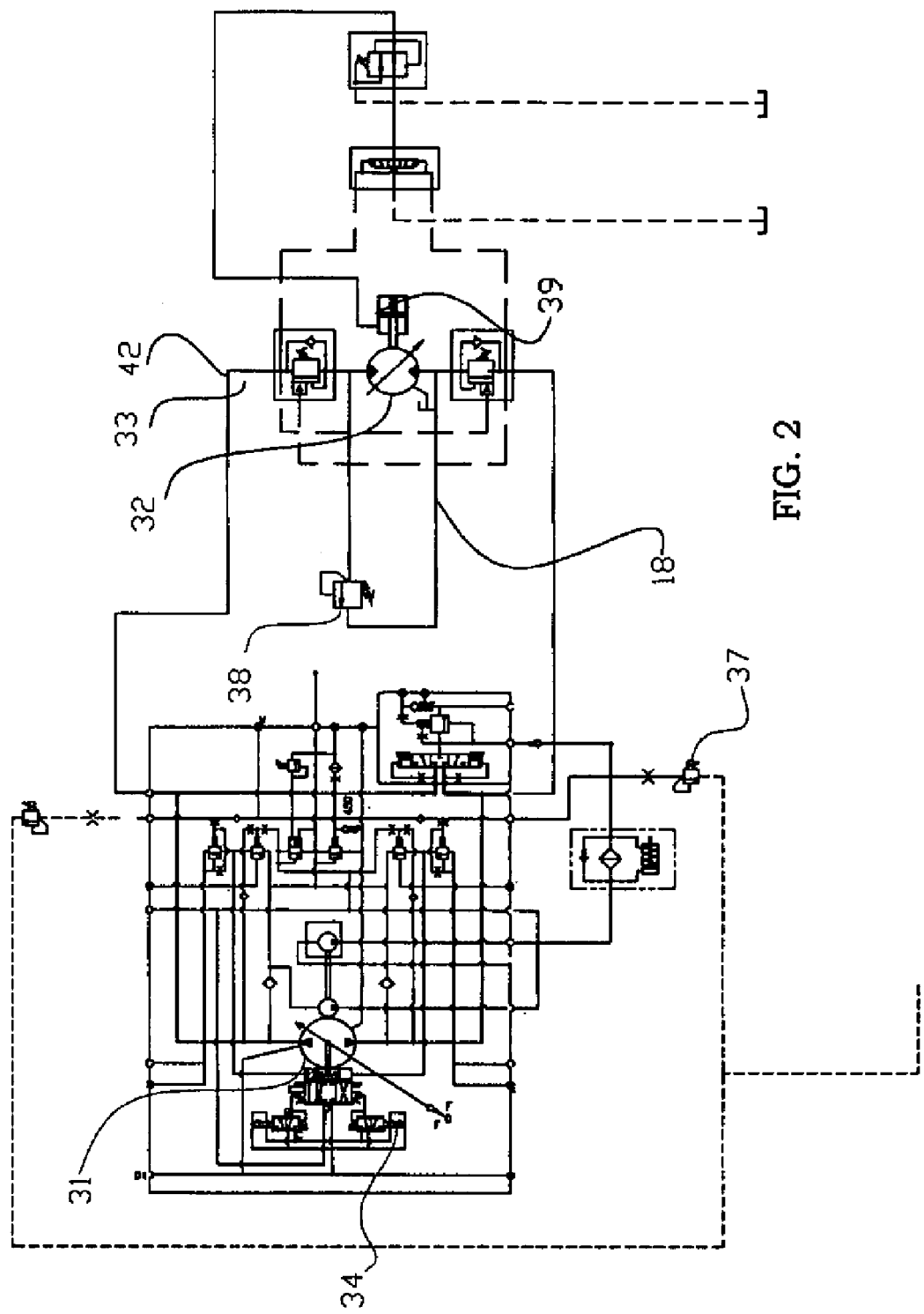
FIG. 2 is an alternative hydraulic circuit for controlling a coiled tubing injector.

In a conventional or "rate of penetration" mode, the operator manipulates the circuit controller 14 which controls the hydraulic pump 1 as shown in FIG. 1 to cause the hydraulic pump 1 to provide hydraulic fluid flow to hydraulic motor 2 to provide rotational torque to the injector drive mechanism 10. Two motors 2 are conventionally provided in parallel to power the gripper chains of the injector, although only one motor is shown for simplicity in FIG. 1. The injector then feeds the coiled tubing string into the ground. The operator is controlling the rate of descent of the coiled tubing drilling string by varying the flow with the circuit controller 14. In this mode, the counterbalance valve 3 is opened by a pilot signal 11 from the pressure line 12 extending from the inlet side of the motor 2. A hydraulic pressure signal 13 from the inlet side of the motor 2 causes hydraulic valve 6 to open, allowing hydraulic pressure 16 to hold released a spring applied hydraulically released brake 9. Since the rate of decent is constant, the weight on bit increases as the bit encounters obstacles or harder formations. Two counterbalance valves are shown in FIG. 1. When both valves are closed, the motor is stalled. One counterbalance valve thus acts to controllably lower the coiled tubing string in the hole, while the other counterbalance valve is used when controllably raising the tubing string.

When the operator manipulates a control 14 to a neutral position, the hydraulic pump 1 ceases to provide hydraulic fluid flow to the hydraulic motor 2. The counterbalance valve 3 closes as there is no longer a pilot signal 13 from the pressure line 12 to the inlet of the motor 2. Spring applied hydraulic released brake 9 is applied as pilot signal 13 is removed and hydraulic valve 6 shifts, removing hydraulic pressure source 16 from brake 9. The application of the brake 9 prevents the weight of the coiled tubing drill string from overpowering the hydraulic motor 2 which would allow the string to descend into the hole unchecked. The counterbalance valve 3 acts as a back-up to the brake 9. The counterbalance valves hydraulically lock the motor 2 to prevent the motor from rotating backwards which would also allow the string to descend into the hole unchecked.

In certain drilling conditions, it is desirable for the operator to control the weight on bit of the coiled tubing drill string rather than the rate of penetration. To accomplish this, the operator manipulates the controls 14 to withdraw the coiled tubing drill string from the well bore by selecting a "pull out the hole" position on the controls. The operator may allow the weight of the coiled tubing string to descend into the well bore by reducing the applied pressure to the hydraulic motor by a pressure control valve 15. The weight of the coiled tubing drill string then exceeds the ability of the hydraulic motor 2 to hold the drilling string in position. Accordingly, the motor 2 reverses direction and the string descends into the well bore. If the string encounters an obstacle, the weight on bit would begin to increase and the hydraulic pressure holding back the string would then begin to decrease. The pump 1 will sense the reduction of pressure in line 12, and cause the pump 1 and motor 2 to slow the rate of decent or even reverse the direction of the pump 1 and motor 2 to maintain the hydraulic pressure the operator has set via the pressure control valve 15. In this drilling mode, the brake 9 is prevented from applying by providing hydraulic pressure signal from an external source line 16. By switching to weight on bit mode, the operator opens a hydraulic valve 7 to allow this pressure source to release the brake. The counterbalance valve 3 is bypassed in this mode to allow the motor to run in the reverse direction. By switching to the weight on bit mode, the operator opens hydraulic valve 5 which allows an external hydraulic pressure signal to open valve 4 which causes the hydraulic fluid to bypass the counterbalance valve 3.

If the bit encounters a softer formation or a void, the hydraulic pressure at the inlet of motor 12 will increase as the weight of the string causes the injector drive mechanism 10 to rotate the hydraulic motor 2 in an "in hole" direction. Sensing this increase in pressure, the hydraulic pump 1 will attempt to reduce the pressure in line 12 to the set point as established by hydraulic valve 15 by providing more hydraulic fluid flow to the hydraulic motor 2.

A significant improvement in reliably operating the injector is achieved by providing a complete bypass to the counterbalance valve. In practice, the counterbalance valve presents a restriction and when attempting to reverse fluid through the counterbalance valve, the system may not properly operate at a desired weight-on-bit at various well depths. By providing a system which bypasses the counterbalance valve instead of trying to pass fluid back through the counterbalance valve, hydraulic valve 7 is open to allow pressure to release the brake and hydraulic valve 5 is opened so that the external hydraulic pressure opens valve 4, which then causes hydraulic fluid to bypass the counterbalance valve.

As a modification to the above-described system, the hydraulic circuit for controlling the injector may be responsive to a WOB signal from a sensor, which may be a surface WOB sensor or may be a downhole sensor. In either case, the hydraulic circuit may use the weight-on-bit sensor rather than sensing a pressure change acting on the motor to determine the varying weight on bit. A WOB sensor signal may then be input to a control valve which regulates the fluid flow rate applied to the injector motors, and thereby controllably lower or raise the tubing with the injector to obtain the desired weight on bit. If the actual WOB decreases, the signal may operate the motors to lower more tubing into the well to increase to actual WOB. If the actual WOB increases, the tubing may be raised (or lowered more slowly) until the actual WOB increases.

FIG. 2 Circuit

An alternative hydraulic circuit will now be discussed, first in the "non-holdback" mode of operation and then in the holdback mode. In a "rate of penetration" drilling system using a coiled tubing injector, the operator may manipulate the hydraulic pump controls 34 to cause the hydraulic pump 31 to provide hydraulic fluid flow to a motor 32 to provide rotational torque to the injector drive mechanism. The injector then feeds the coiled tubing string into the ground. The operator is controlling the rate of descent of the coiled tubing drilling string by varying the flow with the pump controls 34. In this mode, the counterbalance valve 33 may be opened by a pilot signal off the pressure line 42 from the inlet side of the motor 32. A spring applied hydraulically released brake 39 may be held open by a hydraulic pressure signal from the pressure line on the inlet side of the motor 32. Since the rate of decent is constant, the weight on bit increases as the bit encounters obstacles or harder formations.

When the operator manipulates a control 34 to a neutral position, the hydraulic pump 31 ceases to provide hydraulic fluid flow to the hydraulic motor 32. The counterbalance valve 33 closes as there is no longer a pilot signal off the pressure line to the inlet of the motor 32. A spring applied hydraulically released brake 39 may be applied as the hydraulic pressure signal is removed. The application of the brake 39 prevents the weight of the coiled tubing drill string from overpowering the hydraulic motor 32, thereby preventing the string from descending into the hole unchecked. The counterbalance valve 33 thus acts as a back-up to the brake 39, and hydraulically locks the motor 32 to prevent it from rotating backwards which would also allow the string to descend into the hole unchecked.

In certain drilling conditions, it is desirable for the operator to control the weight on bit of the coiled tubing drill string rather than the rate of penetration. To accomplish this, the operator may manipulate the controls 34 to "hold back" the coiled tubing drill string by selecting an out hole position on the controls. The operator adjusts the out hole pressure using the pressure control valve 37 until the drill sting is suspended in the hole at equilibrium, i.e., the hydraulic pressure supporting the drilling string is sufficient to hold the weight of the drill string but not lift it upwards out of the hole. Then the operator allows the weight of the coiled tubing drill string to descend into the well bore by bleeding off the applied pressure on the load supporting side of the closed loop hydraulic drive system by a pressure relief valve 38 to the inlet side of the closed loop circuit. The weight of the coiled tubing drill string then exceeds the reduced pressure in the load supporting side of the closed loop drive, so that the drill string descends in the hole. The motor 32 rotates in the in hole direction to allow the drill string to descend. As the motor rotates, replenishing hydraulic fluid in the closed loop system is supplied by a bleed line 38. The drill string will descend as fast as the pressure differential between the load bearing side of the closed loop circuit and the inlet side will allow.

This alternative hydraulic system will strive to maintain this pressure differential at the operator set value. If the string encounters an obstacle, the weight on bit would begin to increase and the hydraulic pressure holding back the string would then begin to decrease. To maintain the pressure differential, the rate of descent would slow, thereby returning the pressure differential to the set value and consequently maintaining the weight on bit at a constant value. Conversely, if the bit encounters a softer formation or a void, the applied weight on bit would decrease. The pressure differential would then decrease and the system would attempt to regain the pressure differential allowing the drill string to descend faster.

FIG. 3 Circuit

Figure 3:
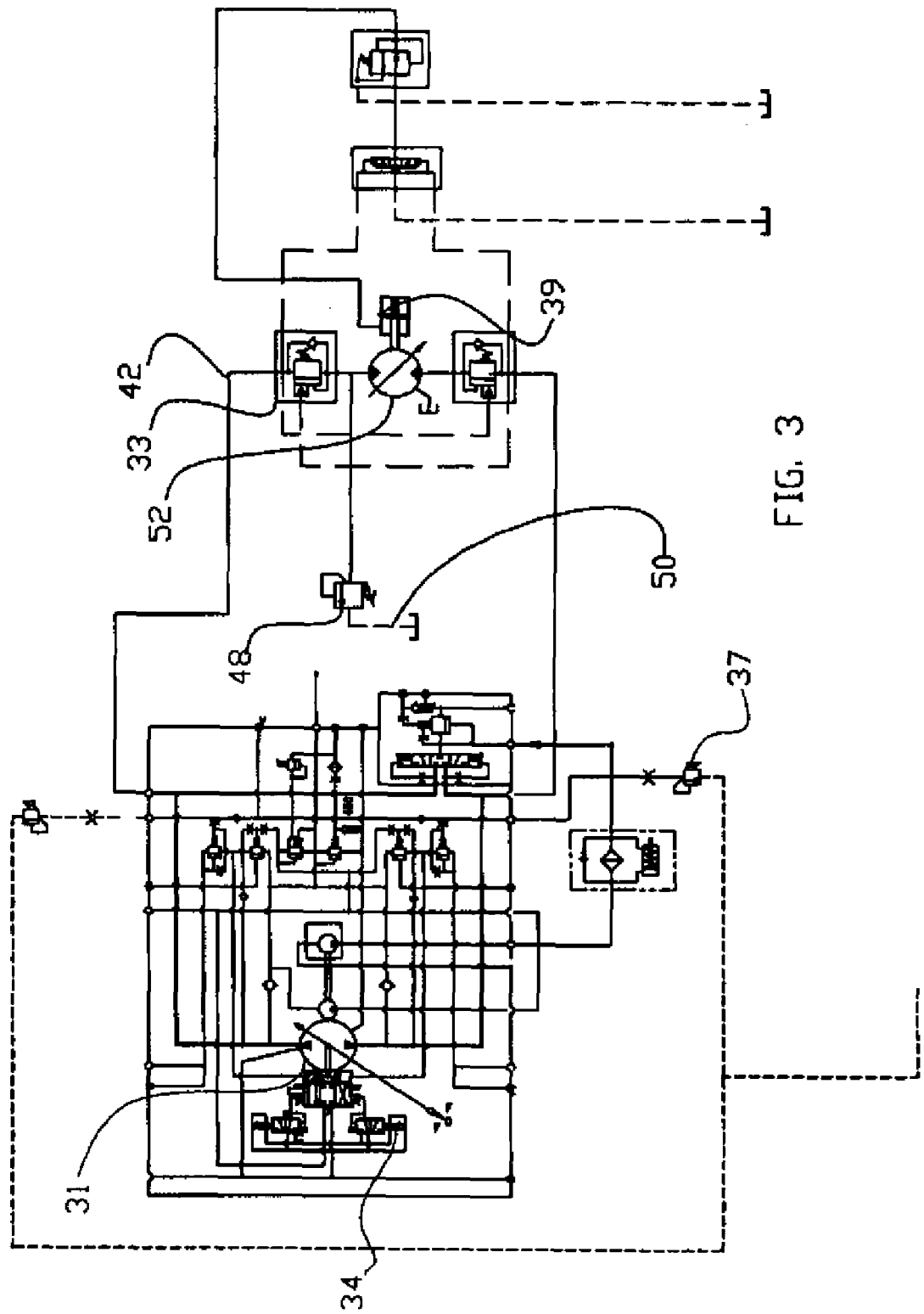
FIG. 3 is yet another embodiment of a hydraulic circuit for controlling a coiled tubing injector.

Yet another hydraulic system in the "non hold back" drilling mode may function as follows. The operator may manipulate the hydraulic pump 31 with controls 34 to cause the hydraulic pump 31 to provide hydraulic fluid flow to a hydraulic motor 52 to provide rotational torque to the injector drive mechanism, as shown in FIG. 3. The injector then feeds the coiled tubing string into the ground. The operator controls the rate of descent of the coiled tubing drilling string by varying the flow with the pump controls 34. In this mode, the counter balance valve 33 is opened by a pilot signal off the pressure line 42 from the inlet side of the motor 52. A spring applied hydraulically released brake 39 is held open by a hydraulic pressure signal from the pressure line on the inlet side of the motor 52. Since the rate of decent is constant the weight on bit increases as the bit encounters obstacles or harder formations.

When the operator manipulates a control 34 to a neutral position, the hydraulic pump 31 ceases to provide hydraulic fluid flow to the hydraulic motor 52. The counterbalance valve 33 closes as there is no longer a pilot signal off the pressure line 42 to the inlet of the motor 52. The spring applied hydraulically released brake 39 is activated as the hydraulic pressure supplied by a pressure line 42 is removed. The application of the brake 39 prevents the weight of the coiled tubing drill string from overpowering the hydraulic motor 52 which would allow the string to descend into the hole unchecked. The counterbalance valve 33 acts as a back-up to the brake 39 and hydraulically locks the motor 52 to prevent it from rotating backwards which would also allow the string to descend into the hole unchecked.

In the hold back mode, this alternative hydraulic circuit functions as follows. In certain drilling conditions, it is desirable for the operator to control the weight on bit of the coiled tubing drill string rather than the rate of penetration. To accomplish this the operator manipulates the controls 34 to "hold back" the coiled tubing drill string by selecting an out hole position on the controls. The operator the adjusts the out hole pressure using the pressure control valve 37 until the drill sting is suspended in the hole at equilibrium. That is the hydraulic pressure supporting the drilling string is sufficient to hold the weight of the drill string but not lift it upwards out of the hole. Then the operator allows the weight of the coiled tubing drill string to descend into the well bore by bleeding off the applied pressure on the load supporting side of the closed loop hydraulic drive system by a pressure relief valve 48 to the hydraulic reservoir line 50. The weight of the coiled tubing drill string then exceeds the reduced pressure in the load supporting side of the closed loop drive the drill string descends in the hole. The motor 32 rotates in the in hole direction to allow the drill string to descend. As the motor rotates, replenishing hydraulic fluid in the closed loop system is supplied by the hydraulic pump 31. The drill string will descend as fast as the pressure differential between the load bearing side of the closed loop circuit and the inlet side will allow.

The system would always strive to maintain this pressure differential at the operator set value. If the string encounters an obstacle the weight on bit would begin to increase and the hydraulic pressure holding back the string would then begin to decrease. To maintain the pressure differential the rate of descent would slow thereby returning the pressure differential to the set value and consequently maintaining the weight on bit at a constant value as well. Conversely if the bit is to encounter a softer formation or a void the applied weight on bit would decrease. The pressure differential would then decrease and the system would attempt to regain the pressure differential allowing the drill string to descend faster.

FIG. 4 Circuit

Figure 4:
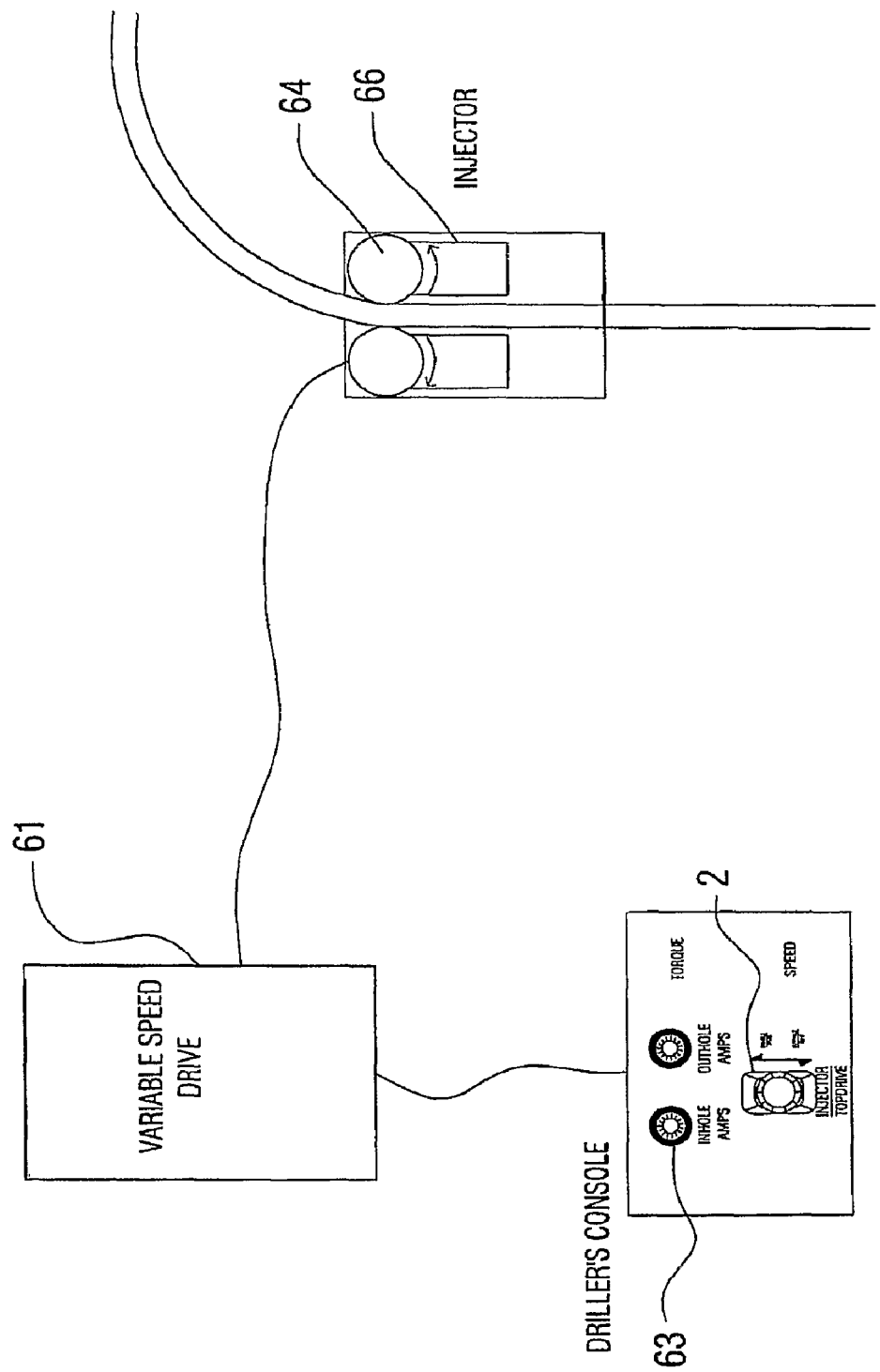
FIG. 4 is an electrical circuit for controlling a coiled tubing injector.

The technique of this invention may also function with an electrical circuit to control power to an electric motor (5) of a coiled tubing injector. In the "non-holdback" mode, the electrical circuit functions as follows. Referring to FIG. 4, the operator manipulates the electric drive 61 using control 62 to cause the electric drive to in hole amperage controlled at 63 and out hole amperage controlled at 62 to one or more electric motors 62 for the injector to provide rotational torque to the injector drive mechanism 64. The injector then feeds the coiled tubing string into the ground. The operator is controlling the rate of descent of the coiled tubing drilling string by varying the amperage with the controls 62 and 63. Since the rate of decent is constant, the weight on bit increases as the bit encounters obstacles or harder formations.

In the hold back mode the electric circuit functions as follows. In certain drilling conditions, it is desirable for the operator to control the weight on bit of the coiled tubing drill string rather than the rate of penetration. To accomplish this, the operator manipulates the controls to "hold back" the coiled tubing drill string by selecting an out hole position on the controls. The operator adjusts the out hole amperage using the amperage control until the drill sting is suspended in the hole at equilibrium, i.e., the electric amperage supporting the drilling string is sufficient to hold the weight of the drill string but not lift it upwards out of the hole. Then the operator allows the weight of the coiled tubing drill string to descend into the well bore by reducing the amperage supporting the load using control 62. The motor 66 rotates in the in hole direction to allow the drill string to descend. The system will strive to maintain this amperage at the operator set value. If the string encounters an obstacle, the weight on bit would begin to increase and the electric amperage holding back the string would then begin to decrease. To maintain the amperage set by the operator the rate of descent would slow, thereby returning the amperage to the set value and consequently maintaining the weight on bit at a constant value. Conversely, if the bit encounters a softer formation or a void, the applied weight on bit would decrease. The amperage would then decrease and the system would attempt to regain the amperage differential, allowing the drill string to descend faster.

It should be understood that the control circuit according to the present invention may control the coiled tubing injector so that it is operable at times in the "in hole" mode which results in greater penetration drilling. At other times, and in many applications during a majority of the time, the control circuit regulates the coiled tubing injector so that the injector exerts a controlled upward force on the coiled tubing while the drilling operation is occurring, with its upward force being less than the coiled tubing string weight. This results in substantially constant weight-on-bit. For each of the embodiments disclosed herein, there may be a readout of the weight on bit available to the operator via a load cell in the injector frame. The operator thus adjusts the power to the injector to achieve the desired weight on bit. Once achieved and placed into a weight on bit mode, the injector system will strive to maintain that weight on bit independent of the operator. Those skilled in the art will appreciate that the coiled tubing string weight is the entire weight of the coiled tubing string and the bottom hole assembly hanging from the rig floor, including drill motors and other downhole equipment, as well as drill dollars added to obtain desired weight to the bottom hole assembly.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A control circuit for a coiled tubing injector for raising or lowering coiled tubing into a well, the injector including an injector motor to power an injector drive mechanism, the injector drive mechanism engaging the coiled tubing to raise or lower the coiled tubing, the circuit comprising:
    a circuit controller for varying power to the injector motor to maintain a substantially constant weight on bit;
    and the circuit controller controlling the injector motor to exert a controlled upward force on the coiled tubing less the coiled tubing string weight, thereby resulting in a substantially constant weight on bit, said circuit controller comprising a hydraulic circuit controller, which reacts to a hydraulic pressure to maintain a substantially constant weight on bit;
    a counterbalance valve opening in response to the circuit controller to power the injector motor for rate of penetration movement of the coiled tubing and closing in response to the circuit controller to prevent the tubing string from descending into the wellbore; a bypass line around the counterbalance valve; and
    a control valve for opening to bypass the counterbalance valve.

2. A control circuit as defined in claim 1, wherein the injector motor is a hydraulically powered motor, and the circuit further comprises: a pump for powering the hydraulic motor.

3. A control circuit as defined in claim 2, wherein the pump is a variable displacement, variable pressure hydraulic pump.

4. A control circuit as defined in claim 1, wherein the control valve is an electrically operated solenoid valve which opens to open the bypass line around the counterbalance valve.

5. A control circuit as defined in claim 1, further comprising: a pressure control valve adjustable to vary fluid pressure to the motor to hold the coiled tubing string substantially stationary.

6. A control circuit as defined in claim 5, further comprising:
    a pressure relief valve for controllable relieving fluid pressure to the motor; and a bleed line to replenish bled hydraulic fluid to a hydraulic circuit.

7. A control circuit for a coiled tubing injector for raising or lowering coiled tubing into a well, the injector including a pair of hydraulically powered injector motors to power an injector drive mechanism, the injector drive mechanism engaging the coiled tubing to raise or lower the coiled tubing, the circuit comprising:
    a circuit controller for varying power to the injector motors to maintain a substantially constant weight on bit responsively to changes in a hydraulic pressure;
    a pump for powering the injector motors; and the circuit controller controlling the injector motors to exert an upward force on the coiled tubing less drill string weight, thereby resulting in a substantially constant weight on bit;
    a counterbalance valve opening in response to the circuit controller to power the injector motors for rate of penetration movement of the coiled tubing and closing in response to the circuit controller to prevent the tubing string from descending into the wellbore;
a bypass line around the counterbalance valve; and
a control valve for opening to bypass the counterbalance valve.

8. A control circuit as defined in claim 7, wherein the pump is a variable displacement, variable pressure hydraulic pump.

9. A control circuit as defined in claim 7, wherein the control valve is an electrically operated solenoid valve which opens to open the bypass line around the counterbalance valve.

10. A control circuit for a coiled tubing injector for raising or lowering coiled tubing into a well, the injector including a pair of hydraulically powered injector motors to power an injector drive mechanism, the injector drive mechanism engaging the coiled tubing to raise or lower the coiled tubing, the circuit comprising:
    a circuit controller for varying power to the injector motors to maintain a substantially constant weight on bit responsively to changes in a hydraulic pressure;
    a pump for powering the injector motors; and the circuit controller controlling the injector motors to exert an upward force on the coiled tubing less drill string weight, thereby resulting in a substantially constant weight on bit; and
    a pressure control valve adjustable to vary fluid pressure to the motor to hold the coiled tubing string substantially stationary.

11. A control circuit as defined in claim 10, further comprising: a pressure relief valve for controllable relieving fluid pressure to the motor; and a bleed line to replenish bled hydraulic fluid to the hydraulic circuit.

12. A control circuit for a coiled tubing injector for raising or lowering coiled tubing into a well, the injector including a pair of hydraulically powered injector motors to power an injector drive mechanism, the injector drive mechanism engaging the coiled tubing to raise or lower the coiled tubing, the circuit comprising:
    a circuit controller for varying power to the injector motors to maintain a substantially constant weight on bit responsively to changes in a hydraulic pressure;
    a pump for powering the injector motors; and the circuit controller controlling the injector motors to exert an upward force on the coiled tubing less drill string weight, thereby resulting in a substantially constant weight on bit; and
    a pressure control valve to control pressure to the injector motors such that the motor speed varies to maintain a substantially constant weight bit.

13. A control circuit for a coiled tubing injector for raising or lowering coiled tubing into a well, the injector including an injector motor to power an injector drive mechanism, the injector drive mechanism engaging the coiled tubing to raise or lower the coiled tubing, the circuit comprising:
    a circuit controller for varying power to the injector motor to maintain a substantially constant weight on bit;
    and the circuit controller controlling the injector motor to exert a controlled upward force on the coiled tubing less the coiled tubing string weight, thereby resulting in a substantially constant weight on bit, said circuit controller comprising a hydraulic circuit controller, which reacts to a hydraulic pressure to maintain a substantially constant weight on bit;
    a counterbalance valve opening in response to the circuit controller to power the injector motor for rate of penetration movement of the coiled tubing and closing in response to the circuit controller to prevent the tubing string from descending into the wellbore; a bypass line around the counterbalance valve;
    a control valve for opening to bypass the counterbalance valve; and
    a pressure control valve to control pressure to the injector motor such that the motor speed varies to maintain a substantially constant weight bit.

* * * * *